United States Patent
Hsu

(10) Patent No.: US 8,641,935 B2
(45) Date of Patent: Feb. 4, 2014

(54) APPARATUS AND METHOD OF MANUFACTURING LIGHT GUIDE PLATE

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 253 days.

(21) Appl. No.: 13/223,284

(22) Filed: Aug. 31, 2011

(65) Prior Publication Data

US 2013/0032958 A1 Feb. 7, 2013

(30) Foreign Application Priority Data

Aug. 3, 2011 (TW) ................................ 100127500

(51) Int. Cl.
*B29D 11/00* (2006.01)

(52) U.S. Cl.
USPC ............ 264/1.27; 216/24; 264/1.38; 264/1.6; 425/174.4; 425/363

(58) Field of Classification Search
USPC .............. 425/174.4, 373, 385, 327, 363, 470; 264/1.6, 2.7, 494, 495, 1.27, 1.24, 264/1.36, 1.38; 216/24, 26
See application file for complete search history.

(56) References Cited

U.S. PATENT DOCUMENTS

| | | | | |
|---|---|---|---|---|
| 5,028,361 A | * | 7/1991 | Fujimoto | ...................... 264/496 |
| 8,297,962 B2 | * | 10/2012 | Hsu | ............................. 425/174.4 |
| 2010/0062217 A1 | * | 3/2010 | Kurematsu | .................... 428/141 |

* cited by examiner

*Primary Examiner* — Mathieu D. Vargot
(74) *Attorney, Agent, or Firm* — Altis Law Group, Inc.

(57) ABSTRACT

An apparatus for manufacturing light guide plate includes a coater containing UV curable glue, a first pressing roller and a second pressing roller. The first pressing roller and the second pressing roller are located nearby each other and space a predetermined distance from each other. The coater distributes UV curable glue on the surface of the first pressing roller or the second pressing roller. The first pressing roller and the second pressing roller cooperatively press the distributed UV curable glue. At least one of the first pressing roller and the second pressing roller includes a transparent shell and a UV lamp in the transparent shell. The UV lamp emits UV light to the other pressing roller. The UV lamp solidifies the UV curable glue pressed between the first pressing roller and the second pressing roller.

6 Claims, 8 Drawing Sheets

APPARATUS AND METHOD OF MANUFACTURING LIGHT GUIDE PLATE

BACKGROUND

1. Technical Field

The present disclosure relates to an apparatus for manufacturing light guide plates, and a method for manufacturing light guide plates using the apparatus.

2. Description of Related Art

A light guide plate is typically employed in a backlight module for converting a point light source or a linear light source into area/plane light source. The light guide plate includes a number of microstructures, the microstructures may be formed on a surface or two opposite surfaces of the light guide plate. The light guide plate with the microstructures can be manufactured through an injection molding method or a printing method.

A method of manufacturing a light guide plate through printing includes following steps: providing a polyester terephthalate (PET) film as a substrate; distributing an ultraviolet (UV) curable glue layer on the PET film; providing at least a pressing roller, each of which includes a number of microstructures formed on an outer surface thereof; pressing the UV curable glue distributed on the PET film using the pressing roller to form corresponding microstructures on the UV curable glue; exposing the PET film with pressed UV curable glue to UV light to solidify the UV curable glue. However, the method of manufacturing a light guide plate must employ a PET film as a substrate, increasing a total thickness of the manufactured light guide plate. In addition, a ratio of light transmission of the PET film is about 90%, which will also limit a total ratio of light transmission of the manufactured light guide plate. Furthermore, the UV curable glue not only needs to adhere the PET film, but also needs to easily depart from the pressing roll, therefore, it is difficult to prepare the UV curable glue with a suitable viscosity coefficient.

What is needed therefore is an apparatus and method for manufacturing light guide plate addressing the limitations described.

BRIEF DESCRIPTION OF THE DRAWINGS

The components of the drawings are not necessarily drawn to scale, the emphasis instead being placed upon clearly illustrating the principles of the embodiments of the apparatus and method for manufacturing light guide plate. Moreover, in the drawings, like reference numerals designate corresponding parts throughout several views.

DETAILED DESCRIPTION

Figure 1:
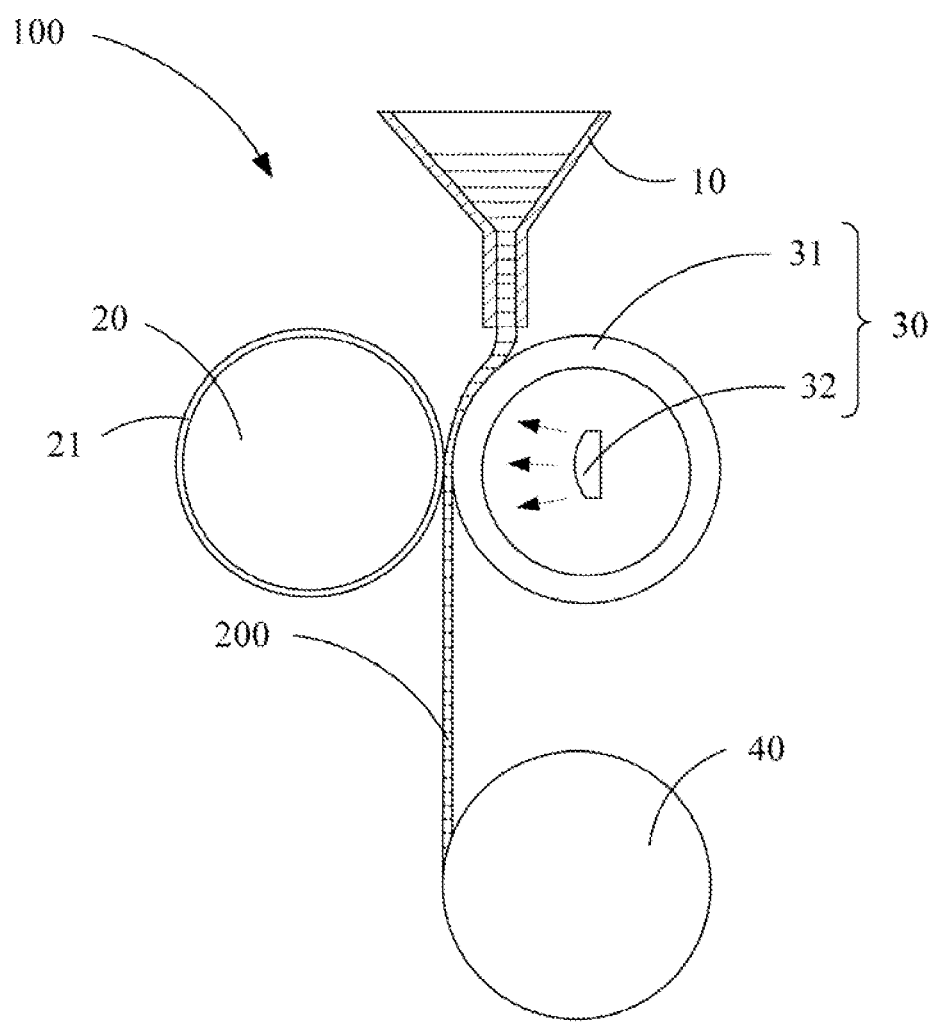
FIG. 1 is a schematic view of a apparatus for manufacturing light guide plate, according to an exemplary embodiment of the present disclosure, the apparatus including a first pressing roller a second pressing roller.

Referring to FIG. 1, a apparatus 100 for manufacturing light guide plate, according to an exemplary embodiment, is shown. The apparatus 100 includes a coater 10, a first pressing roller 20, a second pressing roller 30, and a winding roller 40.

The coater 10 contains UV curable glue 200 and uniformly distributes the UV curable glue 200 on the surface of the first pressing roller 20 or the second pressing roller 30.

The first pressing roller 20 and the second pressing roller 30 are located nearby each other and spaced at a predetermined distance from each other. The distance between the first pressing roller 20 and the second pressing roller 30 is substantially equal to a predetermined thickness of light guide plates to be manufactured. The first pressing roller 20 and the second pressing roller 30 are cooperatively press the UV curable glue 100 therebetween.

Figure 2:
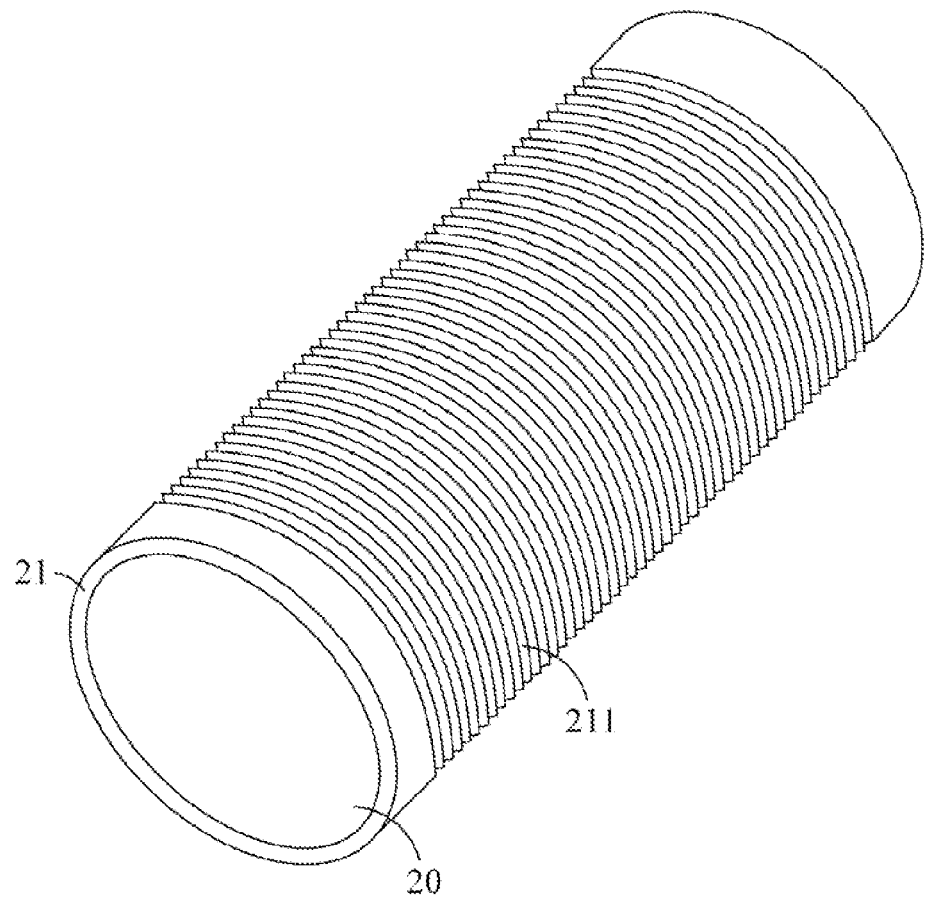
FIG. 2 is an isometric view of the first pressing roller of FIG. 1.

The first pressing roller 20 includes a copper layer 21 coated on an outer surface. In this embodiment, the copper layer 21 is electroplated on the first pressing roller 20. Referring to FIG. 2, A number of first microstructures 211 are formed on the copper layer 21. In this embodiment, each first microstructure 211 is substantially V-shaped.

The second pressing roller 30 includes a transparent shell 31 and an UV lamp 32 located in the shell 31. The shell 31 is a substantial hollow cylinder. In this embodiment, the shell 31 is made from quartz. The shell 31 includes a number of second microstructures 311 (see FIG. 7) formed on an outer surface. In this embodiment, each second microstructure 311 is substantially dot-shaped. The first microstructures 211 and the second microstructures 311 form corresponding microstructures on two opposite surfaces of light guide plates to be manufactured.

Figure 3:
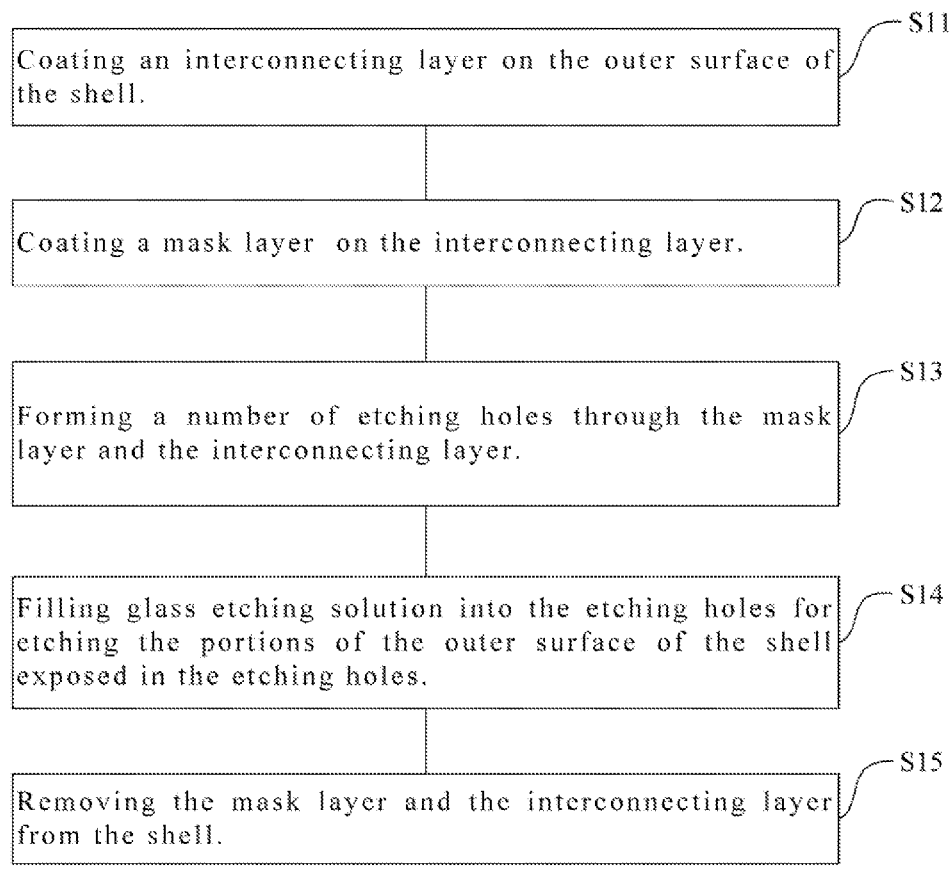
FIG. 3 is a flow chart of a method for producing the second pressing roller of the apparatus of FIG. 1.
Figure 4:
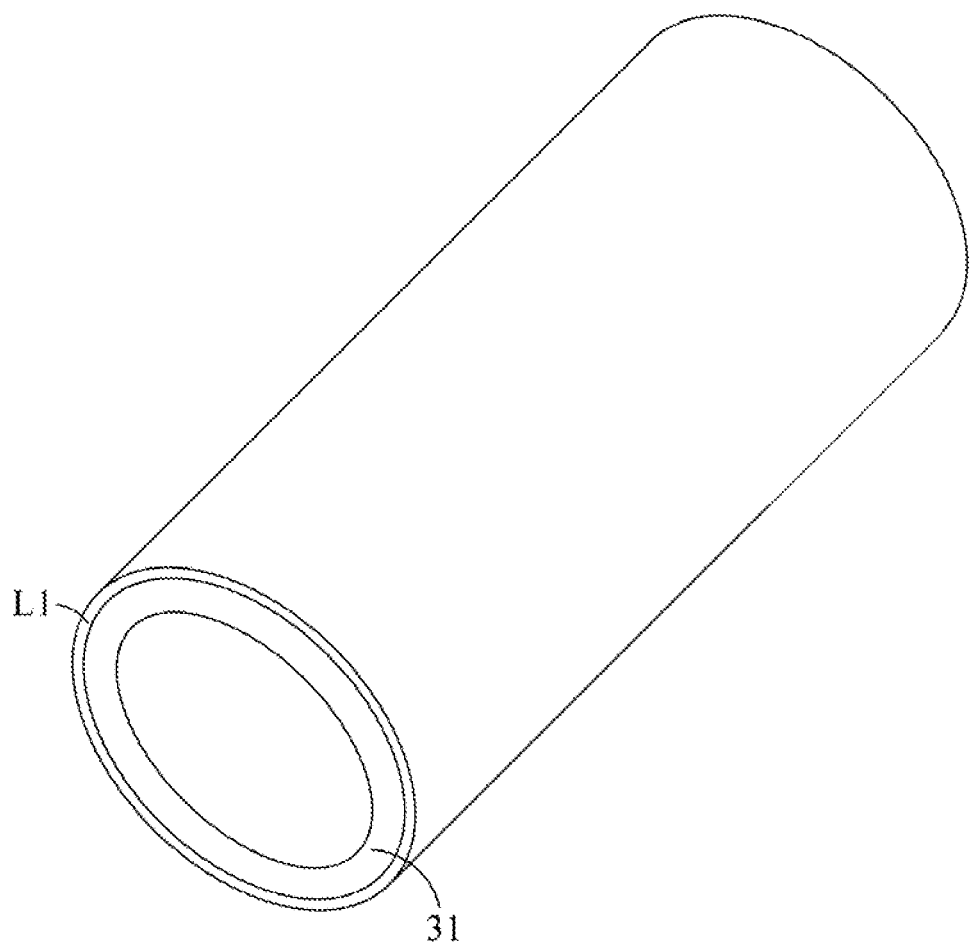
FIGS. 4-7 are schematic views showing successive stages of producing the second pressing roller of the apparatus of FIG. 1.

Referring also to FIG. 3, the second microstructures 311 can be formed on the shell 31 by a method including following steps:

Step S11, referring also to FIG. 4, coating an interconnecting layer L1 on the outer surface of the shell 31. In this embodiment, a material of the interconnecting layer L1 is chrome (Cr), and the thickness of the interconnecting layer L1 is about 50 nanometers.

Figure 5:
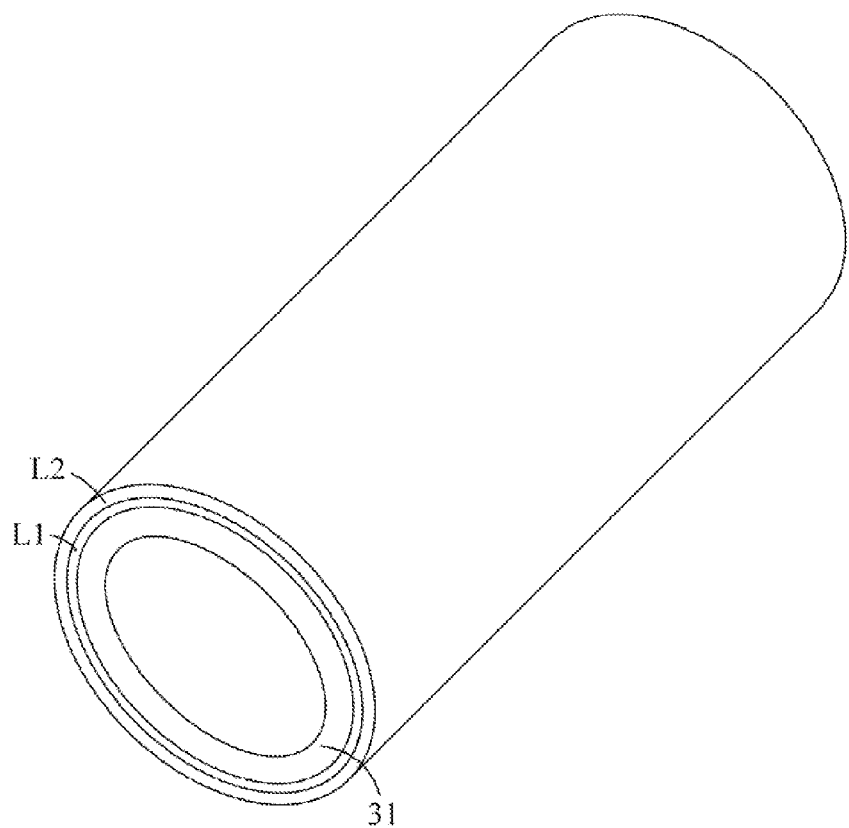

Step S12, referring also to FIG. 5, coating a mask layer L2 on the interconnecting layer L1. In this embodiment, a material of the mask layer L2 is gold (Au), and the thickness of the mask layer L2 is about 100 nanometers. The interconnecting layer L1 can enhance the adhesion of the mask layer L2. The interconnecting layer L1 and the mask layer L2 can be coated on the shell 31 by a method of electron beam-induced deposition (EBID).

Figure 6:
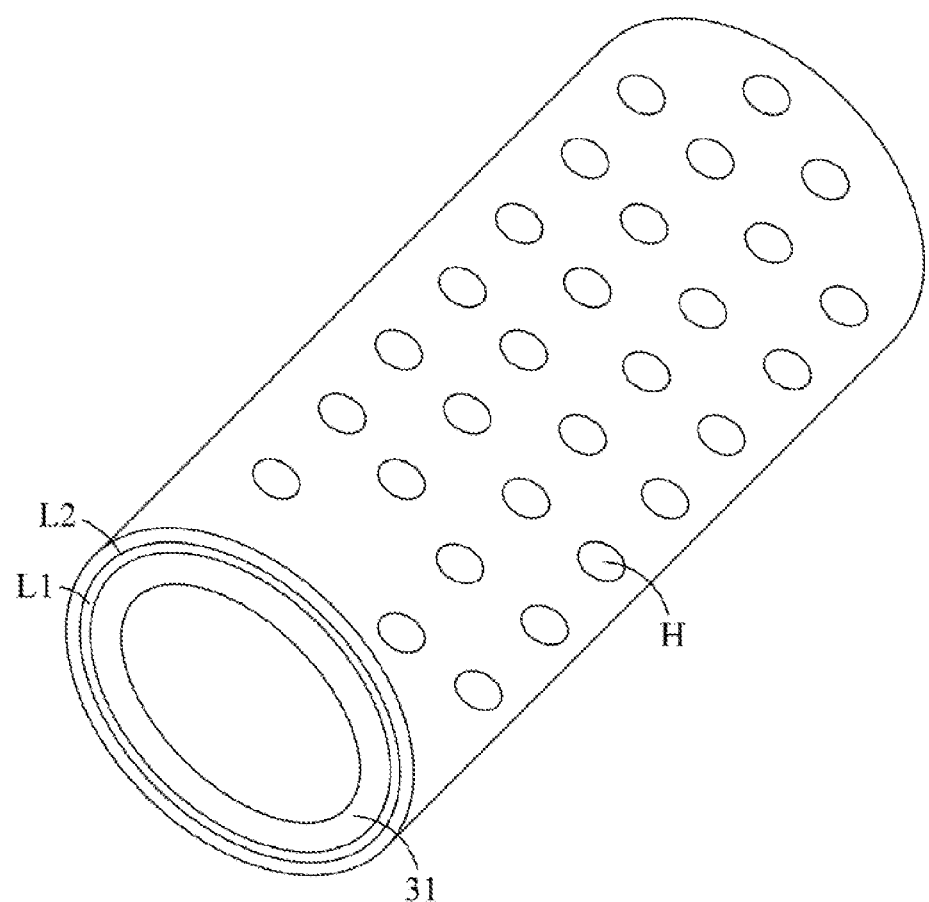

Step S13, referring also to FIG. 6, forming a number of etching holes H through the mask layer L2 and the interconnecting layer L1, and portions of the outer surface of the shell corresponding to the etching holes H are exposed. A pattern of the etching holes H is corresponding to that of the second microstructures 311. In this embodiment, the etching holes H are formed by an excimer laser.

Step S14, filling glass etching solution into the etching holes H for etching the portions of the outer surface of the shell exposed in the etching holes H. An etching depth can be controlled by controlling the length of etching time. During etching, the mask layer L2 can protect portions of the outer surface of the shell coated by the mask layer L2 from being etched by the glass etching solution. In this embodiment, the glass etching solution is hydrofluoric acid (HF).

Figure 7:
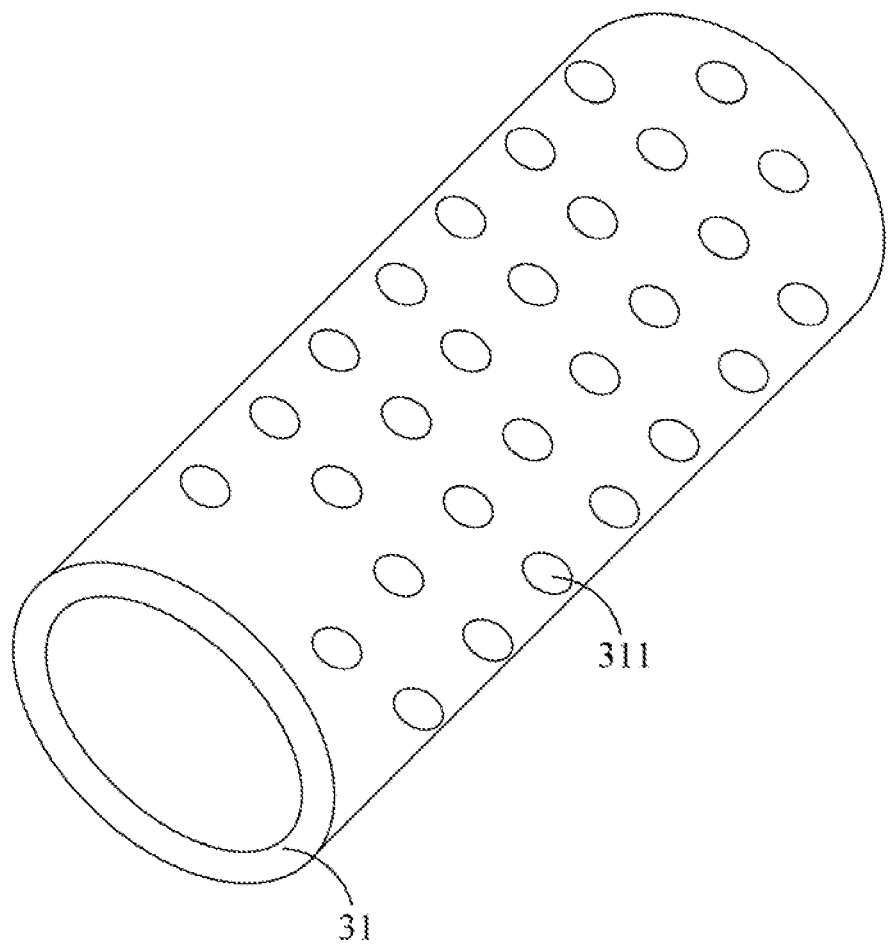

Step S15, referring also to FIG. 7, removing the mask layer L2 and the interconnecting layer L1 from the shell 31. In this embodiment, the mask layer L2 and the interconnecting layer L1 can be removed from the shell 31 by metal etching solution, such as chloroacetic acid.

Referring back to FIG. 1, the UV lamp 32 solidifies the UV curable glue 200 distributed between the first pressing roller 20 and the second pressing roller 30. The UV lamp 32 is fixed in the shell 31 and always emits UV light to the same direction. In this embodiment, the UV lamp 32 emits UV light to the first pressing roller 20.

The winding roller 40 winds the solidified UV curable glue thereon.

The first pressing roller 20, the second pressing roller 30, and the winding roller 40 can be driven by motors (not shown).

In other embodiments, the positions of the first pressing roller 20 and the second pressing roller 30 can be exchanged with each other, or the first pressing roller 20 can be structured the same as the second pressing roller 30.

In use, the first pressing roller 20 starts to rotate clockwise, the second pressing roller 30 starts to rotate anticlockwise, and the winding roller 40 starts to rotate anticlockwise. The coater 10 distributes the UV curable glue 200 on the second pressing roller 30 (or the first pressing roller 20). The UV curable glue 200 is carried between the first pressing roller 20 and the second pressing roller 30 and is pressed by the first pressing roller 20 and the second pressing roller 30, thus the first microstructures 211 and the second microstructures 311 print corresponding microstructures on two opposite surfaces of the UV curable glue 200. During the pressing of the UV curable glue 200, the UV light starts to illuminate the UV curable glue 200 being pressed with UV light to solidify to UV curable glue 200. The winding roller 40 starts to wind the solidified UV curable glue.

In the above process, the UV curable glue 200 has a suitable viscosity coefficient, and easily departs from the first pressing roller 20 and the second pressing roller 30.

Figure 8:
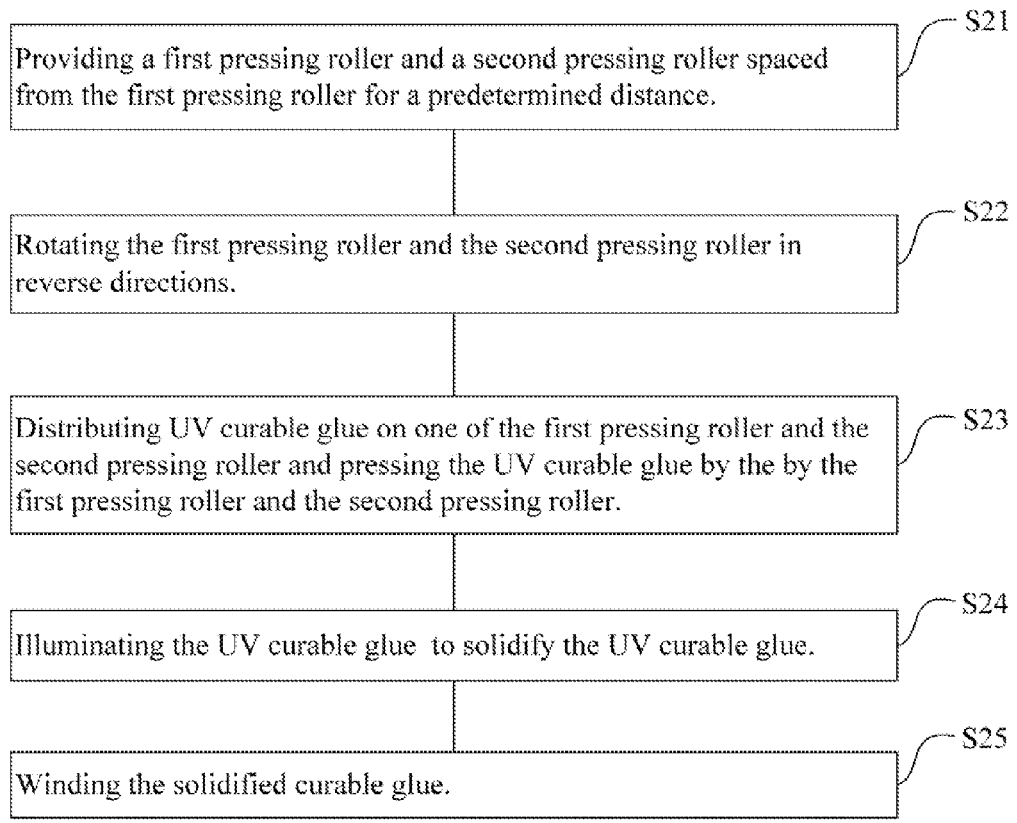
FIG. 8 is a flow chart of a method for manufacturing light guide plate, according to an exemplary embodiment of the present disclosure.

Referring to FIG. 8, a flow chart of a method for manufacturing light guide plate according to an exemplary embodiment, is shown. The method includes following steps:

Step S21, providing a first pressing roller and a second pressing roller, the first pressing roller and the second pressing roller is located nearby each other and spaced for a predetermined distance from each other. At least one of the first pressing roller and the second pressing roller includes a transparent shell and an UV lamp located in the shell, the UV lamp emits UV light to the other pressing roller.

Step S22, rotating the first pressing roller and the second pressing roller, a rotating direction of the first pressing roller is reverse to that of the second pressing roller. In this embodiment, the first pressing roller is rotated clockwise, and the second pressing roller is rotated anticlockwise.

Step S23, distributing UV curable glue on the rotating first pressing roller (or the second pressing roller), the UV curable glue is carried between the first pressing roller and the second pressing roller by the first pressing roller (or the second pressing roller) and is pressed by the first pressing roller and the second pressing roller.

Step S24, illuminating the pressed UV curable glue with UV light of the UV lamp to solidify the pressed UV curable glues.

Step S25, providing a winding roller to wind the solidified curable glue.

The first roller and/or the second roller include a number of microstructures formed on the outer surfaces, the microstructures can print a number of corresponding microstructures on the surface of the UV curable glue.

The apparatus and method for manufacturing light guide plate employ a transparent pressing roller with a UV lamp for pressing and solidifying the UV curable glue at the same time, thus a PET film can be eliminated. Therefore, the thickness of the manufactured light guide plate can be reduced, and the ratio of light transmission of the manufactured light guide plate can be enhanced. In addition, because the UV curable glue is no need to adhered on a PET film, therefore, it is easy to prepare the UV curable glue.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A method for manufacturing light guide plate, comprising:
providing a first pressing roller and a second pressing roller, the first pressing roller and the second pressing roller being located nearby each other and spaced for a predetermined distance from each other, at least one of the first pressing roller and the second pressing roller comprising a transparent shell and an UV lamp located in the transparent shell, the transparent shell comprising a plurality of microstructures formed on an outer surface thereof, the microstructures being formed on the transparent shell by a method comprising:
coating an interconnecting layer on the outer surface of the shell;
coating a mask layer on the interconnecting layer;
forming a number of etching holes through the mask layer and the interconnecting layer, and portions of the outer surface of the shell corresponding to the etching holes being exposed;
filling glass etching solution into the etching holes for etching the portions of the outer surface of the shell exposed in the etching holes; and
removing the mask layer and the interconnecting layer from the shell;
rotating the first pressing roller and the second pressing roller, a rotating direction of the first pressing roller being reverse to that of the second pressing roller;
distributing UV curable glue on one of the rotating first pressing roller and the second pressing roller, the UV curable glue being carried between the first pressing roller and the second pressing roller and being pressed by the first pressing roller and the second pressing roller; and
illuminating the pressed UV curable glue with UV light emitted from the UV lamp to solidify the pressed UV curable glue.

2. The method of claim 1, further comprising:
winding the solidified curable glue by using a winding roller.

3. The method of claim 1, wherein a material of the interconnecting layer is chrome, and a thickness of the interconnecting layer is approximate 50 nanometers.

4. The method of claim 1, wherein a material of the mask layer is gold, and a thickness of the mask layer is approximate 100 nanometers.

5. The method of claim 1, wherein the glass etching solution is hydrofluoric acid.

6. The method of claim 1, wherein the mask layer and the interconnecting layer are removed from the shell by a solution of chloroacetic acid.

* * * * *